(12) United States Patent
Stevens et al.

(10) Patent No.: US 7,186,032 B1
(45) Date of Patent: Mar. 6, 2007

(54) OPTICAL COUPLED SYSTEM

(76) Inventors: Rick C. Stevens, 12711 Edinborough Way, Apple Valley, MN (US) 55124; Kevin J. Thorson, 1167 Westbury Knoll, Eagan, MN (US) 55123

( * ) Notice: Subject to any disclaimer, the term of this patent is extended or adjusted under 35 U.S.C. 154(b) by 69 days.

(21) Appl. No.: 10/746,830

(22) Filed: Dec. 24, 2003

(51) Int. Cl.
*G02B 6/36* (2006.01)
*G01N 21/00* (2006.01)

(52) U.S. Cl. ............... 385/53; 385/95; 385/96; 385/97; 385/98; 385/59; 385/15; 356/73.1

(58) Field of Classification Search ......... 385/39, 385/51, 53, 55, 95, 96, 139, 5, 59, 114, 97, 385/98, 99, 15, 16, 17, 18, 24; 356/73.1
See application file for complete search history.

(56) References Cited

U.S. PATENT DOCUMENTS

| 4,945,776 | A | * | 8/1990 | Yamada et al. ............ 73/866 |
| 5,513,293 | A | * | 4/1996 | Holland et al. ............ 385/134 |
| 5,643,393 | A | * | 7/1997 | Genovese et al. .......... 156/344 |
| 5,680,206 | A | * | 10/1997 | Loch .................... 356/73.1 |
| 6,324,331 | B1 | * | 11/2001 | DeMeritt et al. .......... 385/134 |
| 6,477,306 | B2 | * | 11/2002 | Kato et al. ............. 385/123 |
| 6,690,862 | B1 | * | 2/2004 | Rietveld ................. 385/39 |
| 2002/0041409 | A1 | * | 4/2002 | Laham et al. ............ 359/110 |
| 2004/0184708 | A1 | * | 9/2004 | Ghandi et al. ............ 385/16 |

* cited by examiner

*Primary Examiner*—Brian M. Healy
(74) *Attorney, Agent, or Firm*—Jacobson & Johnson

(57) ABSTRACT

An interface system and a method of making an interface assembly or connection between a first device having a number of optical leads and a second device having a number of optical leads. In the preferred process one forms an optical fabric assembly having a number of free or unattached optical leads without any coupler attached thereto. To transfer a signal from the free or unattached optical leads one forms an optical coupler by connecting one end of an optical lead to a connector. The other end of the optical lead is maintained in a free or unattached condition. One can then test the optical coupler to determine if the connections is properly formed so that a signal can pass into the optical lead through the connector or vice versa.

7 Claims, 5 Drawing Sheets

OPTICAL COUPLED SYSTEM

FIELD OF THE INVENTION

This invention relates to connecting optical fabrics, and more specifically, to a method and apparatus for interfacing signals between an optical fabric in one device and an optical fabric in another device.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the difficulties in interfacing signals between optical systems is that the optical fabric in one optical device needs to be physically connected to the optical fabric in another optical device through a connector that can be engaged and disengaged. One such application is in the backplane of instruments that have an optical fabric or optical fabric assembly. Such systems usually include multiple optical leads that need to be connected to an optical fabric in another optical system. To interface between the two optical systems requires securing an engageable and disengageable connector to the end of the optical leads in each of the optical fabrics.

In one embodiment, a male connector from an optical fabric in a module engages with a female connector in a backplane to enable one to transfer an optical signal into the optical fabric in the backplane or vice versa. Typically, such a backplane has multiple optical leads each having an engageable and disengageable connector secured directly to the end of each of the optical leads that extend from the optical fabric. The mechanical engagement of the connector in the module with the connector in the backplane allows the transfer of a signal from one optical system to another optical system or vice versa.

Typically, the optical fabrics, which are often referred to as an optical fabric assembly since other components are included therein, include a number of elongated or flat ribbon type optical leads that extend outward from the optical fabrics. Each of these optical leads require some type of connection to allow for the transfer of signals to and from the optical fabric assembly. One of the steps in constructing an optical system that transfers optical signals is to secure an engageable or disengageable connector to each of the optical leads. Unfortunately, a faultless securing of a connector to each of the optical leads cannot be guaranteed and is more difficult to achieve than coupling one optical lead directly to another optical lead. As there are other components in the optical fabric assembly it is generally time consuming and costly to produce a completed optical fabric assembly. In addition, securing connectors to each of the leads of an optical system in an operable condition is often a delicate operation since it requires polishing of the ends of leads as well as the action of securement of a connector directly to the optical leads. Quite frequently one or more of the connectors, which are directly secured to the optical leads, are improperly connected. This can result in replacement of the entire fabric assembly, which is expensive and increases the cost of the product. Alternately, one can sever the faulty connector from the optical lead and install a new connector on the optical lead. Both processes hinder the faulitfree building of an interface system and increase the cost of the system.

The present invention overcomes the problem of directly securing the connectors to the optical leads of an optical system by formation of an optical system, such as an optical fabric assembly, without connectors on the optical leads. That is, each of the optical leads has a free end in an unspliced condition. In order to provide an interface system a separate unattached optical lead is first secured or spliced to a connector in a separate process to form an optical coupler. The optical lead and the connector are then tested to determine if the connector with an optical lead i.e. the coupler, can properly transmit an optical signal therethrough. If the connector and the optical lead are properly secured to each other then a free end of an optical lead in the optical fabric assembly, is spliced onto a free end of the optical lead in the optical coupler through a more reliable process such as fusion splicing.

SUMMARY OF THE INVENTION

Briefly, the invention comprises an interface system and a method of making an interface assembly or connection between a first device having a number of optical leads and a second device having a number of optical leads. In the preferred process one forms an optical fabric having a number optical leads having a free or unattached end i.e. without any connector attached thereto. To transfer a signal from the free or unattached optical leads of the optical fabric one forms a separate optical coupler by connecting one end of a separate optical lead to a connector. The other end of the separate optical lead of the optical coupler is maintained in a free or unattached condition. One can then test the optical coupler to determine if the connector is properly attached so that a signal can pass through the connector or vice versa. If the connector is properly attached, one can then secure the free or unattached end of the optical lead on the optical coupler to one of the free or unattached optical leads of the optical device through a fusion splice or the like to form an interface system that can transmit signals to or from the optical fabric to the connector. The connector can then be physically engaged with another connector on an optical lead on another optical device to permit transfer of optical signals from one optical device to the another optical device.

DESCRIPTION OF THE PREFERRED EMBODIMENT

Figure 1:
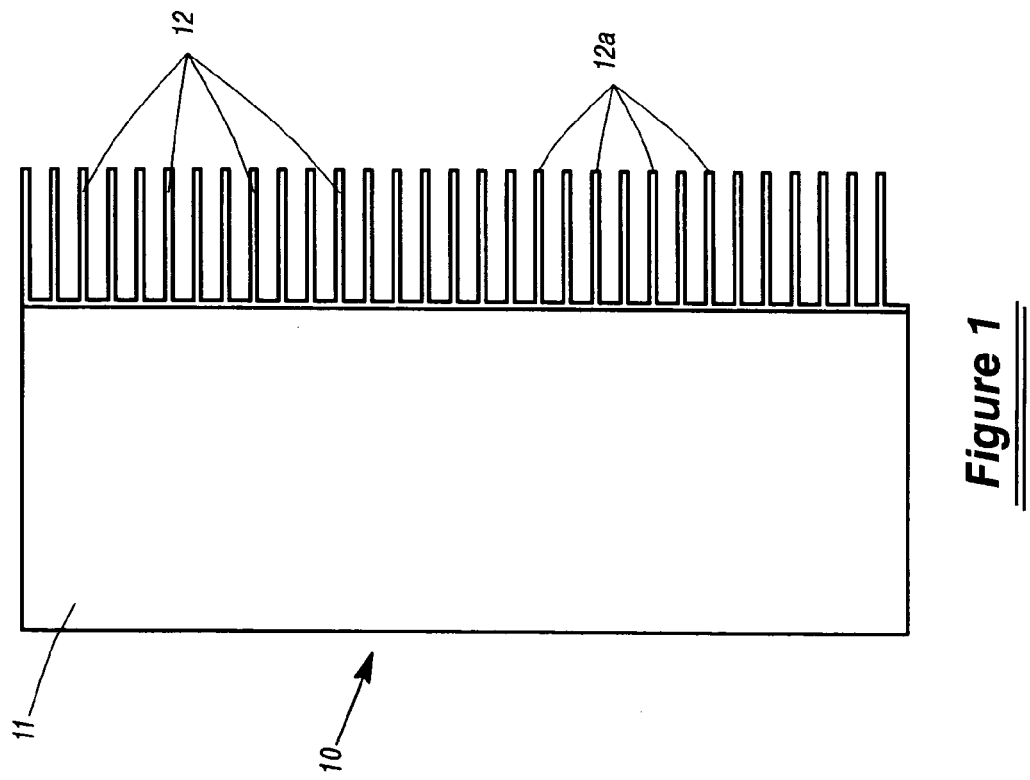
FIG. 1 is a top view of an optical fabric having a number or optical leads extending therefrom.

FIG. 1 is a top view of an optical fabric 10 having a main body 11 with a plurality of integral optical leads 12 extending outward therefrom with each of the plurality of optical leads spaced from each other and each terminating in a free or unattached fusion sliceable end 12a. The main body 11 can comprise an optical fabric with the optical leads comprising elongated optical conductors that extend in a parallel direction outward from the main body 11. Typically, the optical fabric as illustrated in FIG. 1, connects or interfaces to an optical fabric in another optical system by the engagement or disengagement of mechanical type connectors. By reference to mechanical connector it is understood that the connectors can be attached to each other by operator action to permit an optical signal to pass from one connector to the other connector.

The securement of an engageable and disengageable connector to each of the free ends of the optical leads from two different optical fabrics allows one to connect two devices so one can transfer optical signals therebetween. With a number of optical leads 12, as illustrated in FIG. 1, the ability to properly secure the connectors to all of the optical leads without having a faulty connection becomes more difficult since the task of securement of an individual connector to an optical lead is often a delicate task. If a connector is not properly connected to the optical lead, the optical lead with the connector has to be severed from the main body and another connector secured to the shortened optical lead extending from the optical system. In the alternative the main body 11 may be discarded and replaced, however, this is undesirable since it is costly to prepare the main body of the optical fabric. In ether case the repair and replacement of the entire optical fabric or the replacement of connectors on the optical leads of the optical system is costly.

Figure 2:
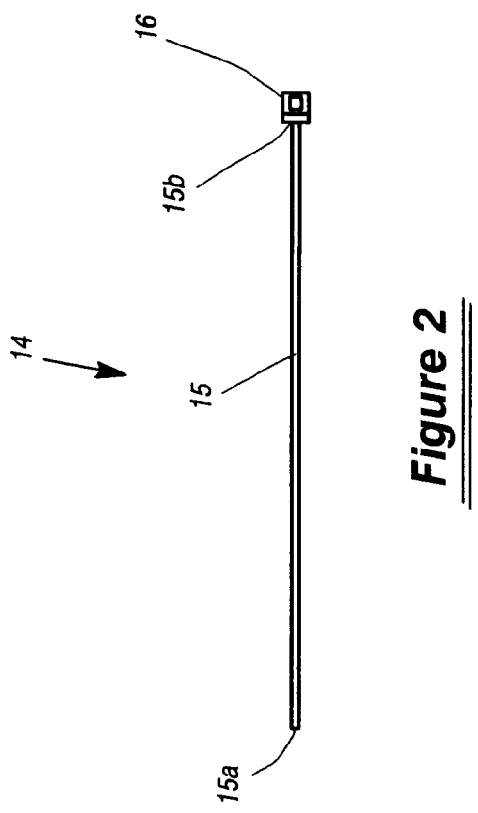
FIG. 2 is an optical coupler comprising an optical lead having a free end and an opposite end with a connector secured thereto.

A reference to FIG. 2 shows an optical coupler 14 having an optical lead 15 having a free or unattached fusion spliceable end 15a and a second end 15b wherein a connector 16 has been secured thereto to permit transfer of an optical signal through the connector 16 and into another system. In the embodiment shown in FIG. 2 end 15a and end 15b comprise severed optical ends, which are optically connectable to each other, and the connector 16 is secured to one end of the optical lead 15 before the optical lead 15 is secured to any component. This sequence in assembly allows one to determine if the connection between the connector 16 and the optical lead 15 is such that optical signals can be sent therethrough before the system is completed. If upon testing it is found that the connector 16 is unsatisfactorily connected to the optical lead 15 the optical lead 15 and the connector 16 can be discarded. On the other end if the optical lead 15 and the connector 16 are properly connected so as to be able to transmit optical signals therethrough one can connect the free end of the optical lead 15 to the free end of the system optical lead 12. By free end it is understood to mean that the end of the optical lead is in a spliceable condition wherein one can secure or splice it directly to another optical lead to permit transfer of an optical signal between the two spliced optical leads.

Figure 3:
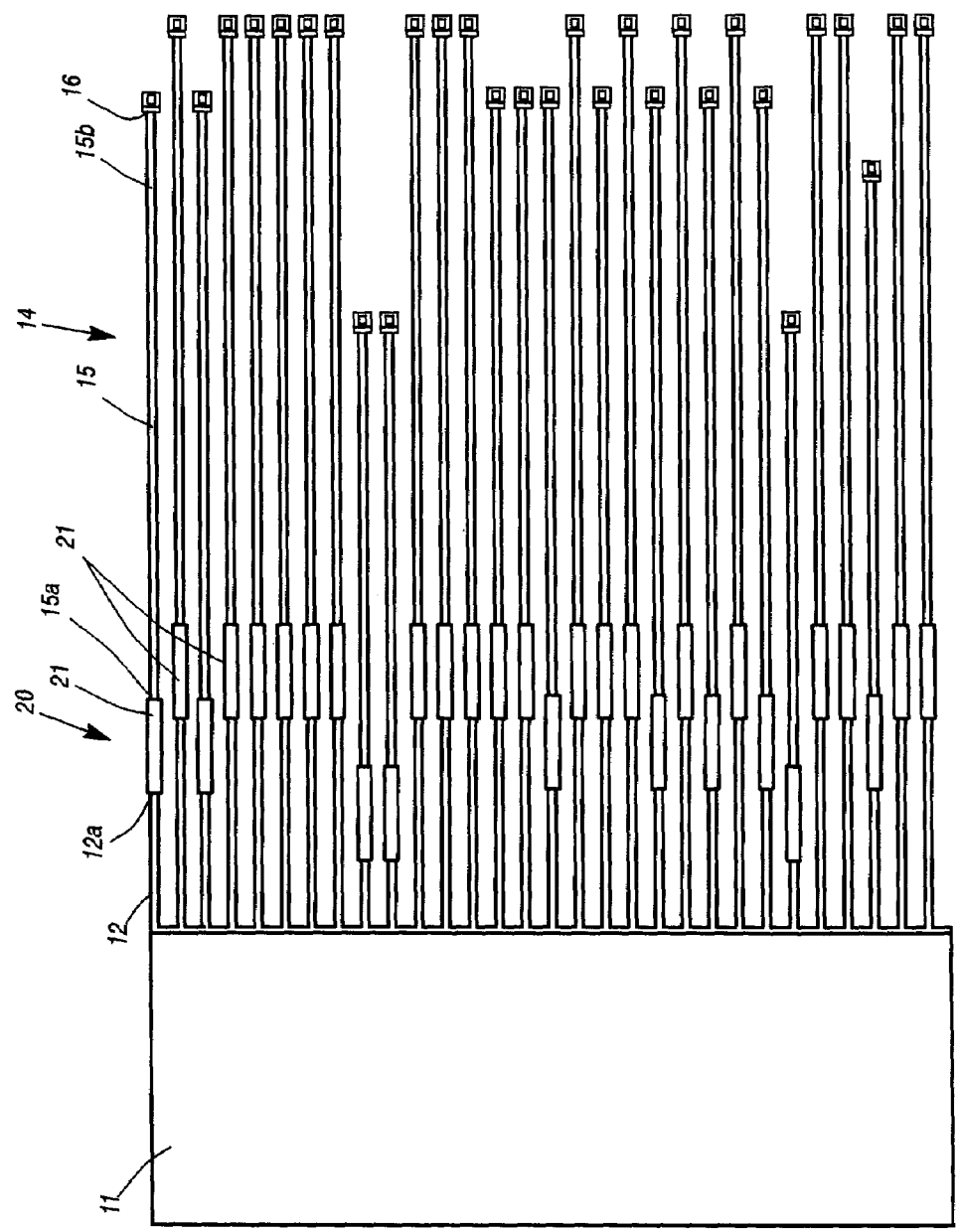
FIG. 3 is a top view of the optical fabric of FIG. 1 with a connector secured to each of the optical leads.

FIG. 3 shows an optical fabric assembly comprising the main body 11 with each of the optical leads 12 connected to an optical lead 15 of an optical coupler through an optical lead fusion splice 21. That is the fusion splice 21 secures the end 12a of the optical lead 12 to the end 15a of optical lead 15 to permit transfer of an optical signal therethrough. As each of the other optical leads are connected in an identical manner they are not described herein.

As can be viewed in FIG. 3 one has been able to create an optical system that can connect to another optical system through an intermediate step of securing a free end of an optical lead 15 of an optical coupler 14 onto a free end 12a of the optical lead extending from main body 11 through a fusion splice.

Figure 4:
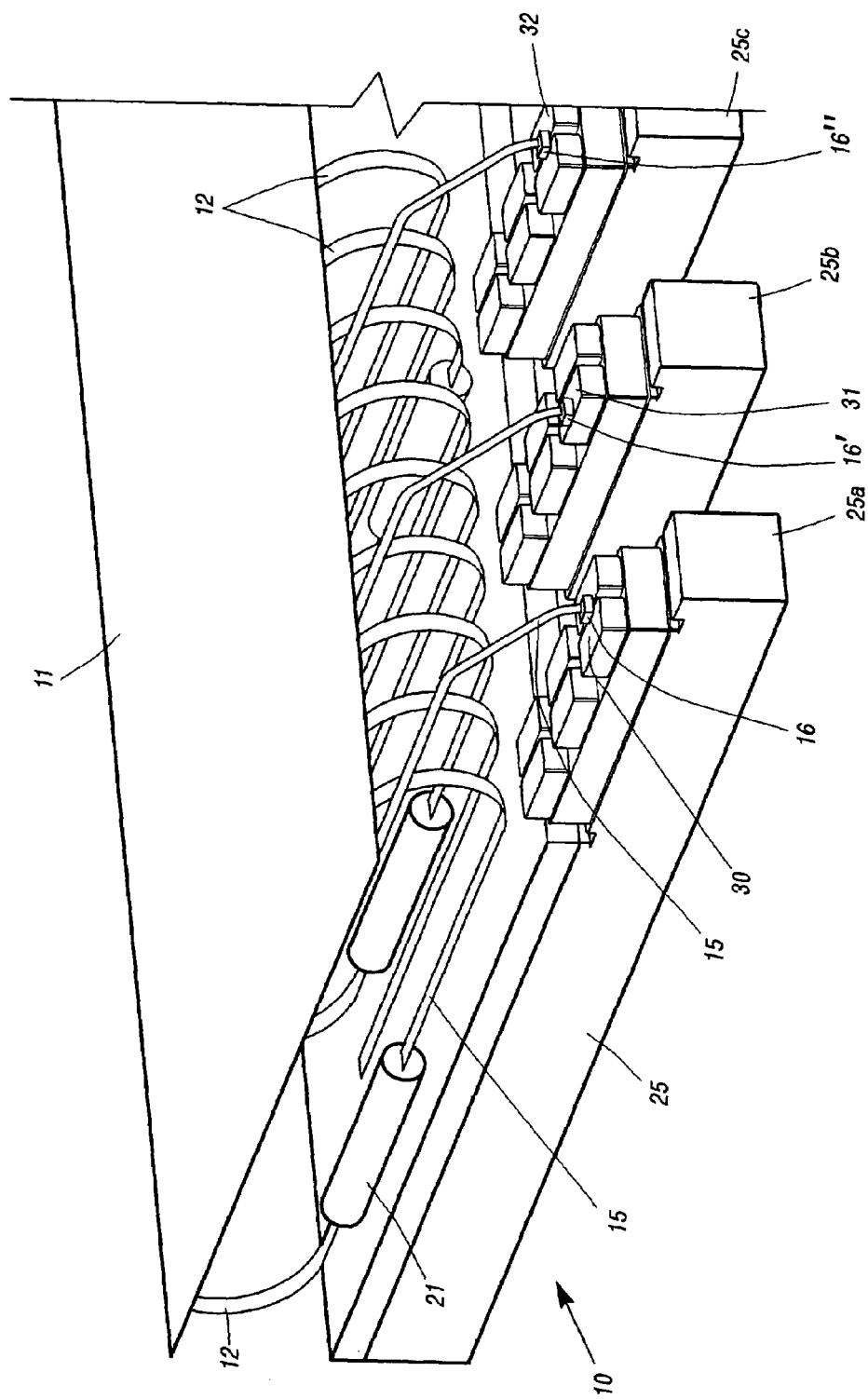
FIG. 4 is a perspective view showing two system interfaced with each other.

FIG. 4 shows the interface system 10 between two optical systems utilizing the present invention. Optical lead 15 having a connector 16 thereon is in mechanical connection with a connector 30 on system 25a. Similarly, optical lead 16' is in mechanical connection with a connector 31 on system 25b and optical lead 16" is in mechanical connection with a connector 32 on system 25c. As can be seen in FIG. 14 the optical connector lead 12 and 15 are flexible to permit the compact placement of the optical connectors proximate one another.

Figure 5:
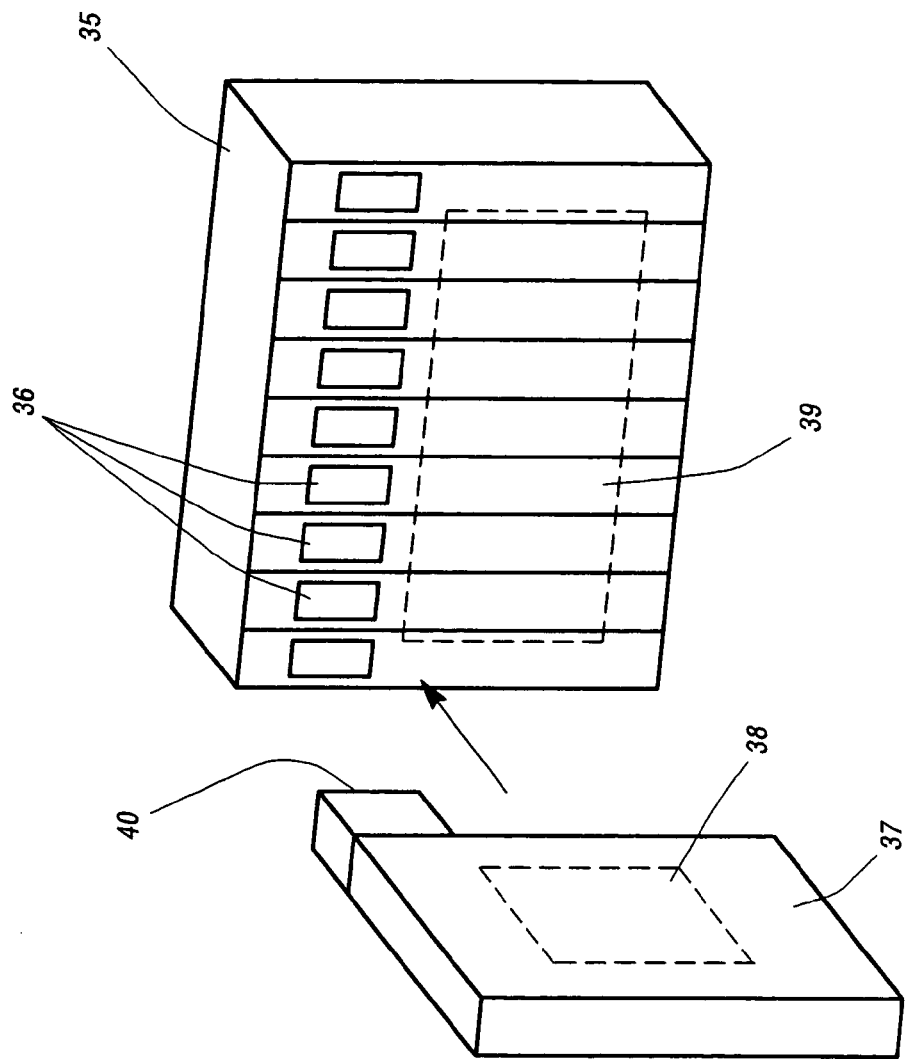
FIG. 5 is a perspective view of an optical backplane positioned proximate an optical module.

FIG. 5 is a perspective view of an optical backplane 35 having a set of optical backplane connectors 36 located therein to illustrate how optical fabrics are used in optical interconnect assemblies like an optical backplane with an optical interconnect module. A dashed line indicates the presence of an optical fabric 39 in the optical backplane 35. Located proximate to the optical backplane 35 is an optical interconnect module 37 with a plug in connector 40 that plugs into a receptacle connector 36 in backplane connect 35. Similarly, a dashed line 38 indicates the presence of an optical fabric in the optical interconnect module.

Figure 6A:
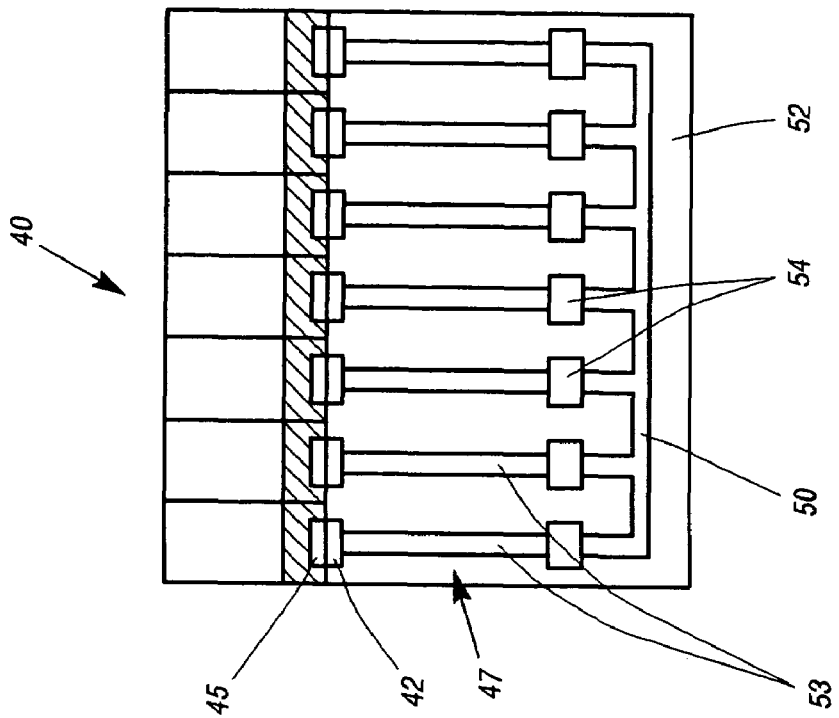
FIG. 6a is top view of an interconnected system of the present invention illustrating how an optical fabric includes optical leads with fusion splices therein.
Figure 6:
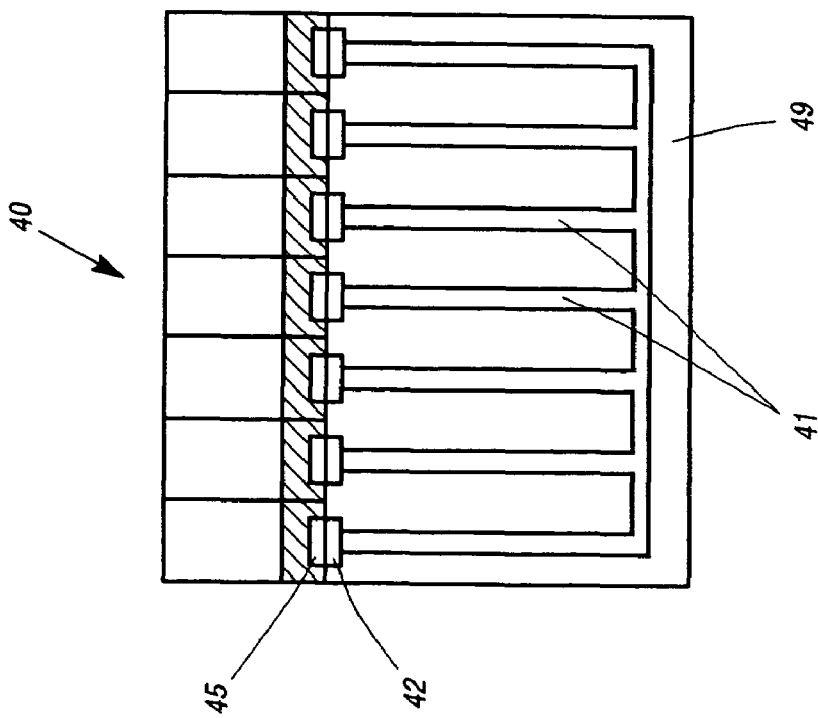
FIG. 6 is top view of interconnected systems illustrating an optical fabric with integral leads and a connectors fastened directly to the optical leads.

FIG. 6 is top view of a an optical interconnect system 40 illustrating how a fabric assembly 49 having optical leads 41 with a connector 42 thereon can be connected to a second system having a connector 45 thereon without the use of the intermediate step of securing the connector to a separate optical lead.

FIG. 6a is top view of how the interconnect system of the present invention would appear. In the embodiment shown each of the optical leads 53 that are connected to main body 50 include a fusion splice 54 that connects optical lead 53 of coupler 47 to the connector 45. Thus in the present invention, it allows one to separately couple an optical lead to the optical coupler and test the optical coupler before securing the optical lead of the optical coupler having the connector to the fabric assembly. Thus, the intended step of securing the connector to a lead not attached to the optical fabric allows one to use a more reliable process to complete the optical fabric assembly.

We claim:

1. A method of interfacing comprising:
   forming an optical device with a device optical lead having a free end;
   securing a connector to a one end of a separate optical lead to form an optical coupler having a connector on the one end and a free end on the opposite end of the separate optical lead;
   testing the connection between the connector and the separate optical lead to verify proper attachment; and
   securing the free end of the optical lead on the optical coupler to the free end of the device optical lead if proper attachment is verified but discarding the connector and the separate optical lead if proper attachment is not verified.

2. The method of claim 1 wherein the step of securing the free end of the optical lead to the free end of the device optical lead comprises forming a fusion splice therebetween.

3. The method of claim 2 including securing a plurality of optical leads each having a connector on one end and a free end on the opposite end to the optical device.

4. The method of claim 3 wherein at least ten connectors each with a free end are secured to at least ten device optical leads.

5. The method of claim 1 wherein each of the system optical leads are arranged in a side by side condition.

6. The method of claim 1 wherein each of the system optical leads are formed of the same length.

7. The method of claim 1 wherein each of the system optical leads are formed in a parallel condition with respect to each other.

\* \* \* \* \*